United States Patent Office 2,809,232
Patented Oct. 8, 1957

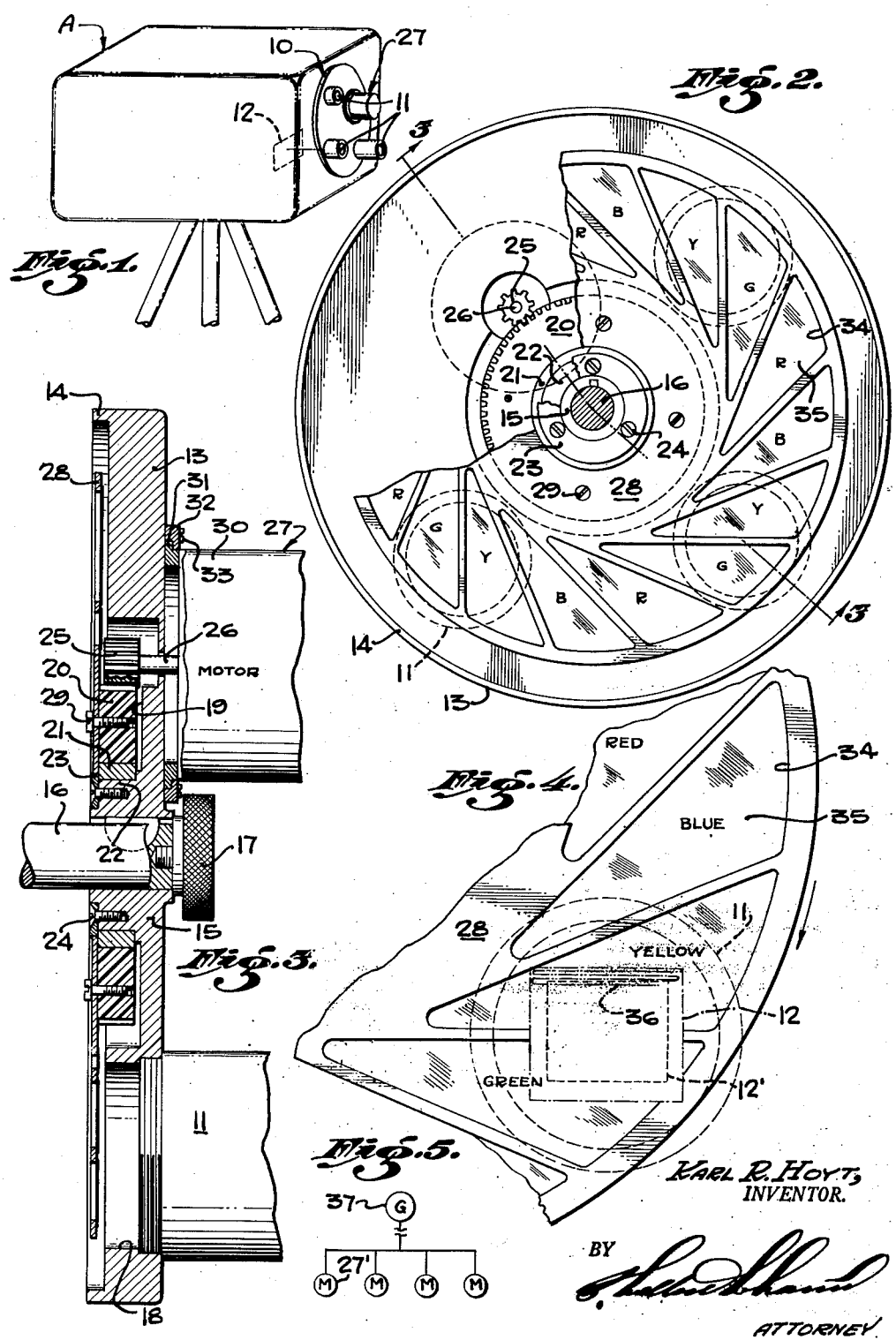

2,809,232

TELEVISION CAMERA COLOR ATTACHMENT

Karl R. Hoyt, Balboa Island, Calif., assignor of twenty-five percent to Stedman B. Hoar, Balboa, Calif.

Application November 17, 1952, Serial No. 320,958

9 Claims. (Cl. 178—5.4)

The present invention relates generally to television, and is more specifically concerned with an attachment for a conventional television camera, whereby it may be utilized for the taking of color pictures.

Television cameras, as now utilized for the taking of black and white pictures, are conventionally constructed with a turret head having a plurality of lenses of different focal lengths which may be selectively moved to a position of use. Such cameras are not, as now constructed, suitable for the taking of color pictures. The present invention, therefore, in its broad concept contemplates as one object a turret head which may be utilized in place of the presently used turret heads, and which incorporates all the components necessary to economically adapt the present cameras for color.

A further object of the herein described invention is to provide a color filter disc in a camera having a plurality of lenses, wherein a shift may be made from one lens to another without disturbing the color filter sequence with respect to the lenses.

Another object is to provide novel means for selectively advancing and retarding the instantaneous positions of the filter areas with respect to their associated lenses.

It is also an object to provide a novel camera system in which a plurality of cameras may be utilized in the pick-up of televised scenes in color, the cameras being arranged for synchronization and adjustment simultaneously from a remote location. For example, a plurality of cameras may have their color discs simultaneously controlled from a central point, such as the monitor control room.

Further objects of the invention will be brought in the following part of the specification, wherein detailed description is for the purpose of fully disclosing the invention without placing limitations thereon.

Referring to the accompanying drawings, which are for illustrative purposes only:

Fig. 1 is an isometric view of a television camera embodying the features of the present invention;

Fig. 2 is a rear view of the turret head attachment, according to the invention;

Fig. 3 is a sectional view of the same, taken substantially on line 3—3 of Fig. 2;

Fig. 4 is a view schematically illustrating the operative association of the filter areas with a lens, and the light activated surface of the pick-up tube; and Fig. 5 is a view schematically representing the remote control of a plurality of cameras from a remote central location, as contemplated by the present invention.

Referring generally to the drawings, for illustrative purposes, there is shown in Fig. 1 a camera A of the type utilized for picking up the scene or object which is to be broadcast by television. In the conventional camera construction, it is conventional practice to incorporate in the camera construction a turret lens mount, as generally indicated at 10, which carries a plurality of lenses 11 of different focal lengths. By suitable mechanism, the turret head may be racked over to selectively bring the lenses in front of a window or opening through which the light rays from the object, after passing through the lens, will be conducted to the surface of an electronically responsive medium 12 which may comprise the photosensitive surface of the mosaic of the iconoscope pickup tube or an equivalent surface of the other well known types of pick-up tubes which permit electronic scanning of the object image.

In the various types of television cameras of conventional construction, the angular position of the lens which may be utilized, as viewed from the front of the camera, will vary. For example, in some arrangements, the use position of the lens would be at 12 o'clock, whereas in the camera chosen for illustration herein, the position of use of a specific lens is between or approximately at 7 or 8 o'clock.

The construction, which has thus far been described, constitutes the usual arrangement for taking black and white pictures. The present invention proposes to provide a turret head containing all the necessary components for adapting a conventional television camera, as utilized for black and white, so as to permit its use for the taking of colored pictures. My improved turret head is arranged for mounting in place of the conventional turret head, and when so utilized will not interfere with the taking of ordinary black and white, but in addition will enable the televising of the object or scene in color, when desired.

More specifically, as shown in Fig. 3, the present invention embodies a circular disc or plate member 13 of aluminum or other suitable material provided on one side with a peripherally extending edge flange 14, and centrally with a hub portion 15 which is arranged for keyed connection with the end of a rackover shaft 16 for rotation therewith. The plate member is retained against endwise removal from the shaft by a retaining screw 17.

As shown in Fig. 3, the plate member 13 is provided with a plurality of circumferentially spaced openings 18 having their inner surface threaded at one end to threadingly receive the barrel of one of the lens mounts 11.

On its rear side, the plate member 13 is formed with an annular recess 19 within which there is rotatively mounted a ring gear 20 of fibre or other suitable material having an internal bearing sleeve 21 which is rotatably supported upon a contracted portion 22 of the hub 15. The sleeve 21 and associated gear are retained in mounted position by a retaining ring 23 held in place by a plurality of securing screws 24.

The ring gear 20 on its outer periphery has toothed engagement with a driving pinion 25 carried by a shaft 26 of an electric motor as generally indicated at 27.

This motor is of the synchronous type in order that the pinion 25 may actuate the gear 20 at a uniform constant speed to rotate a color filter disc 28 at a synchronous speed, this disc being secured adjacent its center to one face of the ring gear 20 by means of suitable securing screws 29. The motor 27 has its stator winding frame 30 provided with an end flange 31 which is frictionally engaged by a retaining ring 32 held by securing screws 33. With this type of mounting, the screws 33 may be slightly loosened so as to permit circumferential shifting of the stator frame 30 so as to relatively advance or retard the instantaneous relationship of the stator and rotor of the motor and thus permit adjustment of the color filter disc with respect to the lenses carried by the plate member 13.

As shown more clearly in Fig. 2, the disc 28 in its peripheral margin is of skeletal construction to provide a plurality of openings 34 within which plates 35 of suitable material to form colored filters are respectively mounted. The colors of the plates 35 are arranged in groups of recurring color filters. For example, in the illustrated arrangement, as shown in Fig. 2, each group in a counterclockwise direction contains the colors blue, red, green and yellow as respectively indicated by the letters "B," "R," "G" and "Y." Moreover, it will be observed generally that the same color plates or filters are similarly associated with each of the lenses 11. That is, the lenses 11 are angularly spaced apart on a circumferentially extending locus line at uniform effective distances, the same length of arc or even multiples of such arc separating each two lenses; and each group of filters occupying an arc of the same length as the effective arc separating the lenses. In Fig. 2, three lenses are illustrated, their focal centers being separated by arcs of 90°, 90° and 180°, the latter to provide space for mounting the motor, and 90° being the effective arc. The filter groups are four in number, each group occupying an arc of 90°. If four lenses are used, they might be spaced at effective arcs of 72°, 72°, 72° and an arc for the motor of 144°, and each filter group would occupy an arc of 72°. This is of importance as it permits racking over a lens of one focal length to a different focal length without changing the filter conditions or the order of movement of the filters with respect to the lens which is moved into a position of use with respect to the filter conditions existing in connection with the previously used lens.

Referring to Fig. 4, the operation of the color disc and the filter plates will be further explained. Looking towards the turret head from the rear side of the surface 12, the perimeter of the light rays which are intercepted by the filter areas during rotation of the disc 28 is represented in dotted lines by numeral 12' as being of smaller size, since the disc 28 is positioned between the surface 12 and the lens 11.

In the conventional camera, the image, or the resulting electronic effect, is scanned in the conventional manner to produce the electrical pulses for transmission. The scanning sweeps are represented by the dash line 36 as being carried across the surface 12 and progressing from top to bottom thereof. The movement of the filter disc 28 is synchronized with the advance of the scanning sweeps so that, while more than one filter color may fall upon the surface 12 at a given instant, each complete scanning will be made while a specific color is carried along over the scanned area. In other words, each time the image is scanned, or a specific area is scanned, it will be through a different colored filter than used during the previous scanning. For example a complete scanning would be made when the yellow filter intercepted the light rays from the object, while the subsequent scannings would be during the time that the blue, red and green filters intercepted the light rays. The above operation is possible, since each color filter occupies a sector of the disc 28 in which the leading edge and the following edge of the sector are non-radial. From Fig. 4, it will be seen that the leading edge of the yellow sector is already moving across the image forming light beam, which impinges on the image surface area 12, and started such movement at the instant that the scanning sweep 36 jumped to the top of the image surface and started its descent. It is only necessary that this leading edge should be kept ahead of the scanning sweep as it progresses downwardly across the image surface. The green sector immediately ahead of the yellow sector is still occluding a portion of the image beam, this portion however falling on a part of the image which was scanned in the sweeping operation just ended. The blue sector above the yellow sector is about to enter the image forming beam with its leading edge, but will stay behind the descending scanning sweep until it jumps back to start a new scanning operation descent. It is therefore unnecessary in the present invention to have the filter plates of such large extent as to completely cover the entire area of the surface 12 or the perimeter 12' at all times during a complete scanning operation, and it will be seen that the area of the image formed by light rays passing through any one of the filters will always be less than the total image area.

Should the occasion arise, for some reason, that the color filter changes before the completion of a complete scanning of the surface 12, the instantaneous relative position of the color disc 28 may be advanced or retarded with respect to the scanning speed by the simple operation of rotating the frame 30 of the motor 27 in appropriate direction, as previously described.

During the televising of a scene or object, there are times when it is desired to utilize a plurality of cameras which may be simultaneously receiving the image through lenses of different focal length. During the televising operation, it may be desirable to shift from one camera to the other, and in so doing it is important that all of the cameras are synchronized and operating with the same color sequence with respect to the filter colors associated with each of the lenses. Under such circumstances it is desirable that the speed of the respective color discs of the cameras can be simultaneously advanced or retarded with respect to their instantaneous positions. In the present invention, provision is made for such operation by providing, as shown in Fig. 5, a selsyn motor 27' for each of the cameras. These motors are connected with a selsyn generator 37 which may be mounted in the monitor control room remotely from the camera positions. As is well known in the art, it is a characteristic of selsyn motors to operate at the same synchronous speed as the selsyn generator. By arranging the selsyn generator so that its field may be angularly advanced in the same manner as described for the motor 27, the driving motors 27' may be controlled in unison to accomplish the desired result.

Various modifications may suggest themselves to those skilled in the art without departing from the spirit of my invention, and, hence, I do not wish to be restricted to the specific form shown or uses mentioned, except to the extent indicated in the appended claims.

I claim:

1. In a color television camera, a turret head comprising: a support; a plurality of lenses carried by said support selectively movable to a position of use; a rotatable disc member extending over said lenses; successive color filter areas carried by said member arranged in groups of similarly recurring colors, and having the same colors similarly positioned with respect to each lens; a synchronous motor having a stator and a rotor, the rotor having a driving connection with said disc member; and means mounting said stator for angular adjustment in a circumferential direction about the axis of rotation of said rotor, whereby the instantaneous position of said color areas with respect to the associated lens may be varied.

2. In a color television camera, a turret head comprising: a movable support; a plurality of lenses carried by and movable with said support selectively to a position of use; a rotatable disc member on said support extending over said lenses; successive color filter areas carried by said member arranged in groups of similarly recurring colors, and having the same colors similarly positioned with respect to each lens; and a synchronous motor mounted on said support having a driving connection with said disc member.

3. A turret head color adapter for a television camera, comprising: a support adapted to be removably mounted on said camera; a plurality of lenses carried by said support selectively movable to a position of use; a rotatable member having a peripheral margin extending over said lenses; recurring groups of filter areas of different colors carried by said rotatable member, said groups being so arranged that the same colors are similarly associated and moved with respect to each of said lenses; power means for driving said member at a predetermined constant speed; and means for selectively advancing and retarding the instantaneous synchronous positions of the areas with respect to said lenses.

4. A removably attachable turret head for converting a television camera for color, comprising: a support; a plurality of lenses carried by said support; a rotatable member having a peripheral margin extending over said lenses; recurring groups of filter areas of different colors carried by said rotatable member, said groups being so arranged that the same colors are similarly associated and moved with respect to each of said lenses; power means for driving said member at a predetermined constant speed; and means for simultaneously varying the instantaneous synchronous phase positions of the areas with respect to said lenses.

5. A removably attachable turret head for converting a television camera for color, comprising: a rotatable support; a plurality of lenses carried by said support and movable as a unit; a rotatable member carried with said support and having a peripheral margin extending over said lenses including recurring groups of filter areas of different colors, said groups being so arranged that the same colors are similarly associated and moved with respect to each of said lenses; power means for driving said member at a predetermined synchronous speed; and rackover means for simultaneously shifting said lenses and member as a unit, while maintaining their operative relationship, to bring a selected lens into a use position.

6. A removably attachable turret head for converting a television camera for color, comprising: a support; a plurality of lenses carried by said support said lenses being movable as a unit to selectively place the lenses in a position of use; a synchronous rotatable member carried by said support and having a peripheral margin extending over said lenses including recurring groups of filter areas of different colors, said groups being so arranged that the same colors are similarly associated and moved with respect to each of said lenses; means for simultaneously rotating said member with said lenses independently of the synchronous rotation of said member; and power means for driving said member at a predetermined speed.

7. In a color television camera: a plurality of lenses supported for selective movement to a position for focusing light rays from an object upon an image plane; colored filters mounted for successive movement through the path of said light rays, said filters being arranged in groups of similarly recurring colors, and having the same colors similarly positioned during their respective movement with respect to each lens; and power means for moving said filters at a predetermined synchronous speed.

8. In a color television camera, a turret head comprising: a rotatable support; a plurality of lenses carried by said support for selective movement to a position of use, said lenses being relatively spaced on a locus circumference line an arc distance subtended by an angle evenly divisible into 360 degrees or a multiple of said arc; a rotatable disc member coaxial with said support and extending over said lenses; successive color filter areas carried by said member arranged in groups of similarly recurring colors, and having the same colors similarly positioned with respect to each lens, said groups each occupying a sector of said member equal in arc angle to the arc angle at which said lenses are spaced; and a synchronous motor mounted on said support having a driving connection with said disc member.

9. A removably attachable turret head for converting a television camera for color, comprising: a support; a plurality of lenses carried by said support selectively movable from one position to an adjacent position of use; a synchronously rotatable member having a peripheral margin extending over said lenses and including recurring groups of filter areas of different colors, said groups being so arranged that the same colors are simultaneously associated and moved with respect to each of said lenses in each of said positions at any instant; means for simultaneously rotating said member with said lenses independently of the synchronous rotation of said member; and power means for driving said member at a predetermined speed independently of movement of said support.

References Cited in the file of this patent
UNITED STATES PATENTS

| | | |
|---|---|---|
| 2,296,019 | Camarena | Sept. 15, 1942 |
| 2,384,259 | Quinby | Sept. 4, 1945 |
| 2,413,075 | Schade | Dec. 24, 1946 |
| 2,531,031 | France | Nov. 21, 1950 |